Patented Dec. 1, 1925.

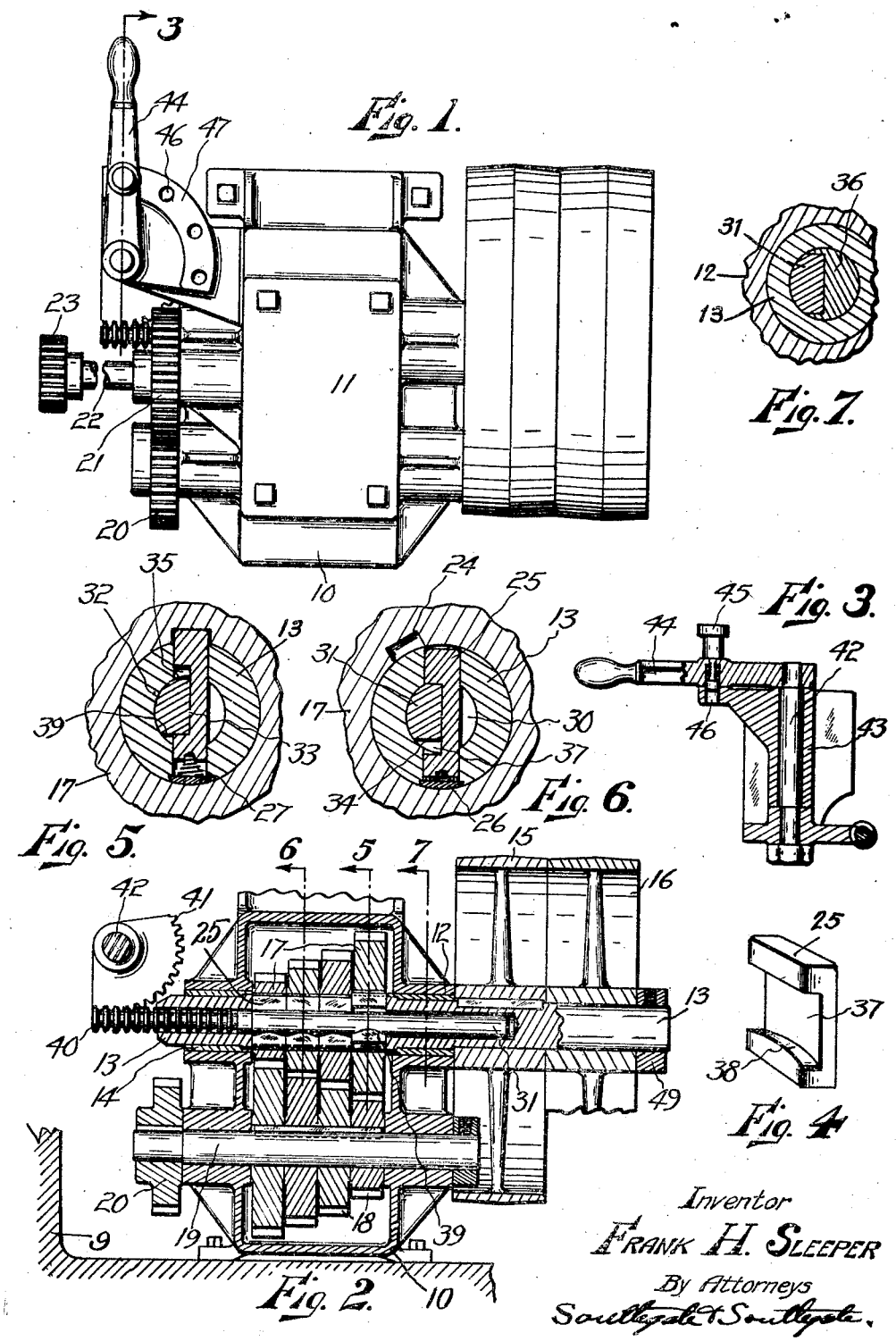

1,563,594

UNITED STATES PATENT OFFICE.

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS.

SPEED-CHANGE GEARING.

Application filed March 22, 1922. Serial No. 545,842.

*To all whom it may concern:*

Be it known that I, FRANK H. SLEEPER, a citizen of the Dominion of Canada, residing at Worcester, in the county of Worcester and State of Massachusetts, have invented a new and useful Speed-Change Gearing, of which the following is a specification.

This invention relates to a variable speed power transmitting device.

The principal objects of the invention are to provide a self contained, individually attachable construction in which all the gears can be conveniently enclosed; to provide a device in which the speed changes can be effected by simple mechanism and without bringing the gears into and out of mesh, thus avoiding the possibility of breaking or injuring the teeth when the speed is changed; to provide a speed controlling rod which moves lengthwise to effect the changes, with effective guiding means, and located in the center of one of the shafts of the speed changing gearing, so that it will have central bearings therein and be accurately supported and held thereby in all its adjusted positions, and to provide a simple form of key for locking the several gears to the shaft in which said rod is located, and a spring, for operating the key, collapsible to occupy a minimum space.

Other objects and advantages of the invention will appear hereinafter.

Reference is to be had to the accompanying drawings, in which

Fig. 1 is a plan of a speed changing device constructed in accordance with this invention;

Fig. 2 is a longitudinal central sectional view of the same;

Fig. 3 is a sectional view of the hand operating mechanism on the line 3 of Fig. 1;

Fig. 4 is a perspective view of one of the keys, and

Figs. 5, 6 and 7 are sectional views on the lines 5, 6 and 7 respectively, of Fig. 2.

I have shown the invention as embodying a closed casing 10 which can be fixed on the base or other part of the machine 9 with which it is to be used in any convenient position, but it is shown as especially adapted to be secured horizontally on the base of an ordinary machine. It is provided with a removable cover 11, but otherwise is entirely enclosed and detachable as a unit with all its parts.

I have shown it as having opposite hubs 12 in the upper part constituting bearings for the main or driving shaft 13, bushings 14 being shown in these bearings. On this driving shaft are located the tight pulley 15 and the loose pulley 16, but of course it can be driven in any desired manner.

The shaft is shown as provided with a series of spur gears 17 all alike except that they are of different diametrical sizes. They transmit power to a corresponding series of gears 18 on the driven shaft 19. This driven shaft is mounted in hubs on the casing constituting bearings for it and provided with a gear 20 which may transmit power to any desired machine or mechanism, but I have shown it here as meshing with a gear 21 on a shaft 22 which may constitute the driving shaft of the machine on which it may be used. For example, the invention may be used for driving the coiling machine shown in my prior Patent No. 1,266,070 in which case this shaft 22 would be the shaft 89 in that patent, and a pinion 23 thereon would perform the same functions as the pinion 92 shown on that shaft in that patent. The invention, however, is not limited in its use to any particular machine, but can be used for transmitting power at varying speeds for any desired purpose.

The gears 18 are all keyed to the shaft 19 and the gears 17 are all loose on the shaft 13, except when they are connected with it by the means herein shown. The gears 17 and 18 are all in mesh with each other in pairs all the time so that when the speed is changed there is no act of bringing new teeth into mesh with each other and no chance of the usual troubles from that cause.

Each of the gears 17 is provided with a central perforation for receiving the shaft 13. It is also provided with a keyway 24 extending radially outward from this cylindrical perforation.

Through the shaft 13 there is a transverse passage equal in length to the total width of the several gears 17, and in this passage there are diametrically sliding keys 25 one within each gear. Extending along one side of the shaft 13 is an insert 26 which is dove-tailed and inserted from the outer end. This extends all the way along the passage in which the keys 25 are located. It supports a series of coiled springs 27, each of the conical type, but so coiled that when compressed from the position shown in Fig. 5 to that shown in Fig. 6 it will occupy a space only equal to the diameter of the wire of which it is made, each coil setting into the next larger coil. These springs support the keys 25 and force them outwardly into the respective keyways 24 whenever they come into registration and whenever the control of the keys 25 permits it.

Through the driving shaft 13 extends a central cylindrical passage 30. I have shown it as extending from the outer end to a position registering with the tight pulley. At any rate it goes far enough to constitute a proper bearing for the controlling rod 31 at each end. This rod is of a cylindrical shape on one side at 32 to fit the passage 30, but it is slabbed off diametrically at the opposite surface 33 and also slabbed off at the bottom at 34, and also at the top at 35. The part of this rod which extends beyond the gears is received in a guide 36 which is of such shape as to fill up the rest of the space in the passage 30 and guide and hold the rod accurately therein.

It will be oberved that each of the keys 25 is provided with a rectangular recess 37 on one side in which the flat side of the rod 31 is located. This recess 37 has a bottom offset surface 38 that slopes up gradually toward the center. I have shown it as convex. The rod 31 has at one point in its length a recess 39 of shape complementary to that of this convex surface 38. This is located at a desired point along the surface 34 above mentioned.

At the outer end the rod 31 is provided with a circular rack 40 with which meshes a segmental gear 41 on the shaft 42 mounted in a bearing 43 located on the end of the casing 10. This shaft has fixed on its outer end a controlling handle 44 provided with a spring pin 45, the end of which is adapted to enter in any one of a series of notches 46 in a fixed segment 47 mounted on the bracket which carries the bearing 43. There are as many of these notches 46 as there are gears in each series.

In the operation of the device the head of the spring pin 45 is drawn out to pull the end of the pin out of the notch 46 in which it is located. Then the handle 44 is moved out of registering position. Now the operator moves the handle along until the pin automatically sets into the next notch 46. The result of this is to move the rod 31 from a position in which one of the gears 17 is positively connected with the driving shaft 13 to that in which the next of these gears is positively connected with it. This connection is brought about by the recess 39 moving away from one convex surface 38 on one of the keys 37 and thus leaving the flat surface 34 to push down this key against its spring and remove the other end of the key from the corresponding key slot 24. As the rod slides along still further the recess 39 comes into registration with the next convex surface 38 and allows that key to move inwardly through the action of its spring 27, and thus push the corresponding key 25 against the inner surface of the gear so that the next time the gear turns around to a position in which the key registers with the keyway 24 the key will enter it. The two positions are shown in Figs. 6 and 5 respectively. It will be noted that all the gears rotate all the time if any one is connected with the shaft 13. When the rod is moved to the left or right to bring the surface 39 beyond the last gear or to a position between two gears the device is in neutral position. This is important because in the operation of certain machine tools it is desirable at times to operate them without using the speed change device. The end of the key 25 is chamfered off at its forward and rear edges.

It will be observed that in assembling the machine the driving shaft can be provided with its gears, keys, and springs and then the plate 26 can be pushed in from the end to fix them in position. The shaft 19 with its gears can be assembled in the casing in an obvious manner. The gears 17 are then put in and brought into mesh with the respective gears 18 and lined up on a temporary arbor with the bearings 12. The shaft 13, without the rod, is provided with the keys 25 outside the casing, the springs 27 assembled on them, and the sliding plate 26 moved in longitudinally to hold them from coming out on that side, this plate being at this time located at the bottom. The guide 36 is first introduced and now the rod 31 is placed in the proper position with respect to the keys and moved in. The keys can be held down by hand against their springs as the end of the rod enters at the end. The rod 31 is turned to bring it into registration with the guide 36 after it passes through all the gears. The rod 31 is moved to a point at which it will hold all the keys out of action and then the shaft is introduced, pushing the temporary arbor out in front of it. After this the pulleys 15 and 16 are attached and also a holding collar 49. The bushing 14 on one end is inserted with the shaft and at the other end it is inserted afterwards.

This affords a speed changing device which can be manufactured as a unit and employed for various kinds of machines. The advantage of setting it up separately as a unit and not combined with the rest of the machine is of importance in many industries. It permits of the separate care of the speed changing device, its ready replacement by another one in case of trouble with out taking the machine to pieces, and the convenient use of different lubrication from that used for the rest of the machine. There is no possibility of connecting two pairs of gears at the same time.

Although I have illustrated and described only a single form of the invention I am aware of the fact that modifications can be made therein by any person skilled in the art without departing from the scope of the invention as expressed in the claims.

Therefore I do not wish to be limited to all the details of construction or to the exact relationship of the parts herein shown and described, but what I do claim is:—

1. In a speed changing device, the combination of a driving and a driven shaft, two sets of gears on said shafts meshing constantly with each other in pairs, keys in said gears, a longitudinal reciprocable rod mounted in said shaft, a spring in each gear for operating said keys, and a flat plate dove-tailed into the shaft longitudinally on it behind the said springs to hold them in place, said plate being slidable into position along the shaft.

2. In a speed changing device, the combination of two shafts, a set of gears of different sizes rotatable with one of said shafts, corresponding gears loose on the other shaft, all of said gears meshing constantly in pairs, the loose gears having keys movably mounted therein, and having a longitudinal passage, a longitudinally reciprocable rod mounted and guided in said passage and having a depression in its surface, each of said keys having a convex surface along which the depressed surface of the rod is adapted to move, said rod being of cylindrical form on one side and flat on the other and located near the center of the shaft, and the keys each having a recess therein having a surface for receiving the flat side of the rod, said recess being longer than the width of the rod transverse to said flat surface, the passage in the shaft for receiving the rod extending materially beyond the keys, a guide in said passage beyond the gears filling the passage except for the space in it occupied by the rod, and means for moving the keys transversely when the convex and depressed surfaces are in registration.

In testimony whereof I have hereunto affixed my signature.

FRANK H. SLEEPER.